(12) United States Patent
Kennedy et al.

(10) Patent No.: US 9,106,394 B1
(45) Date of Patent: Aug. 11, 2015

(54) SIGNAL EVENT DETECTION SYSTEM (75) Inventors: Shawn P. Kennedy, Saunderstown, RI (US); Donald Hummels, Glenburn, ME (US)

(73) Assignee: The United States of America as presented by the Secretary of the Navy, Washington, DC (US)

( * ) Notice: Subject to any disclaimer, the term of this patent is extended or adjusted under 35 U.S.C. 154(b) by 2586 days.

(21) Appl. No.: 11/713,837

(22) Filed: Feb. 22, 2007

Related U.S. Application Data

(60) Provisional application No. 60/777,705, filed on Feb. 24, 2006.

(51) Int. Cl.
*H04L 27/00* (2006.01)
*H04L 1/00* (2006.01)

(52) U.S. Cl.
CPC .................. *H04L 1/0071* (2013.01)

(58) Field of Classification Search
None
See application file for complete search history.

(56) References Cited

U.S. PATENT DOCUMENTS

| | | | |
|---|---|---|---|
| 4,959,863 A * | 9/1990 | Azuma et al. | 704/272 |
| 5,867,479 A * | 2/1999 | Butash | 370/210 |
| 6,005,900 A * | 12/1999 | Zangi | 375/350 |
| 6,336,201 B1 * | 1/2002 | Geile et al. | 714/755 |
| 6,411,653 B1 * | 6/2002 | Arunachalam et al. | 375/260 |
| 7,095,781 B1 * | 8/2006 | Hsu et al. | 375/224 |
| 2001/0030940 A1 * | 10/2001 | Hellberg | 370/210 |
| 2003/0105787 A1 * | 6/2003 | Jang et al. | 708/300 |
| 2004/0042557 A1 * | 3/2004 | Kabel et al. | 375/260 |
| 2004/0246994 A1 * | 12/2004 | Munoz et al. | 370/484 |
| 2007/0071121 A1 * | 3/2007 | van Rooyen | 375/260 |
| 2010/0104044 A1 * | 4/2010 | Kishigami et al. | 375/299 |

OTHER PUBLICATIONS

Kennedy, "Soft Impact Location Capability (SILC): Modeling Blind-Loaded and Plugged Impacts and Timing Statistics for the Polyphase Impact Detection Algorithm", NUWC-NPT Technical Memo 05-028.*

* cited by examiner

*Primary Examiner* — Shuwang Liu
*Assistant Examiner* — Gina McKie
(74) *Attorney, Agent, or Firm* — James M. Kasischke; Michael P. Stanley (57) ABSTRACT

A soft impact location system and method which detects and processes wide-band acoustic signatures for testing long-range munitions. The system incorporates a real-time digital signal-processing algorithm that detects the impact signature, processes it, and calculates the time-of-arrival (TOA). The system comprises a polyphase filter bank, boxcar filter, a detection analyzer for detecting an impact, and time-tagging software for calculating the time of impact. The system splits the received hydrophone signal into evenly spaced energy bands, processes each band individually, and then recombines the data to provide a precise time of detection.

6 Claims, 8 Drawing Sheets

SIGNAL EVENT DETECTION SYSTEM

CROSS-REFERENCE TO RELATED APPLICATIONS

The present application derives priority from provisional patent application No. 60/777,705, filed Feb. 24, 2006.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention generally relates to a system and method for detecting and time-tagging surface impact acoustic signatures, and more particularly to a soft impact location capability (SILC) system and method incorporating real-time polyphase digital signal processing for detecting and time-tagging surface impact acoustic signatures.

(2) Description of the Background

Figure 1:
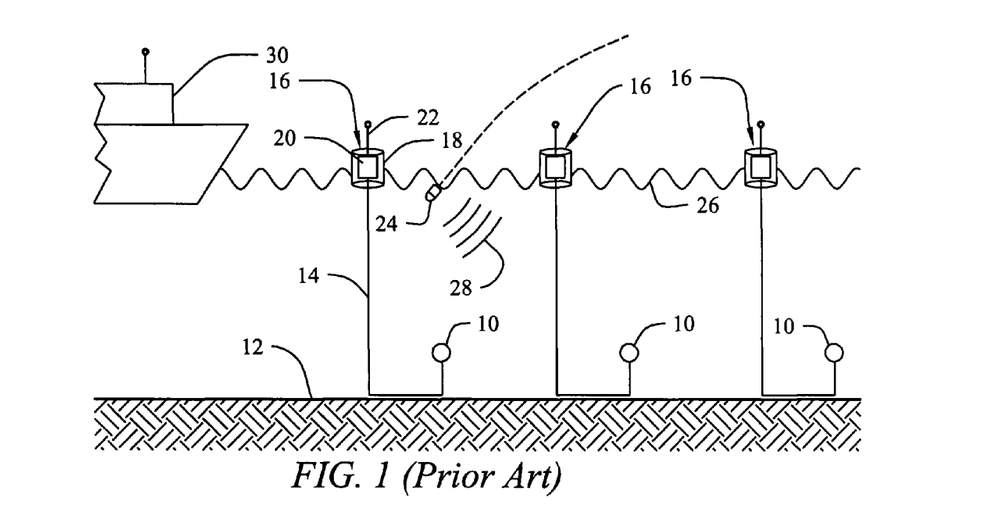
FIG. 1 is a block diagram of the prior art soft impact location capability (SILC) system.

Acoustic tracking may be utilized for tracking and studying a variety of marine subjects including aquatic life, seismic phenomena, and man-made objects such as submarines, underwater munitions, etc. There are numerous different types of acoustic tracking arrays. FIG. 1 shows the SILC system, each acoustic sensor 10 is moored to the ocean bottom 12 and is individually cabled 14 to its own surface buoy 16. Each buoy 16 contains a surface float 18, digital signal processing (DSP) system 20, a radio link 22, and bottom-mounted acoustic sensors 10, called hydrophones, which receive acoustic waves. Acoustic tracking arrays can be used for detecting the "soft-impacts" of long-range munitions 24. Specifically, when munitions are fired they travel a distance before impacting the ocean surface 26. As these projectiles 24 hit the surface, the impact acoustic signature 28 propagates through the water and is detected by sensors 10 associated with the multiple buoys 16. The hydrophone signal is converted from analog to digital form in a DSP 20 located in the buoy 16. The DSP system 20 processes the impact signature and then sends the time tagged detections to a tracking and display computer 30 via a radio link 22. Data from multiple buoys is utilized to determine the water surface location and impact time of the projectile. The tracking and display computer 30 is joined to a radio receiver and located on a remote platform. The remote platform can be on land, at sea or in air.

Figure 2:
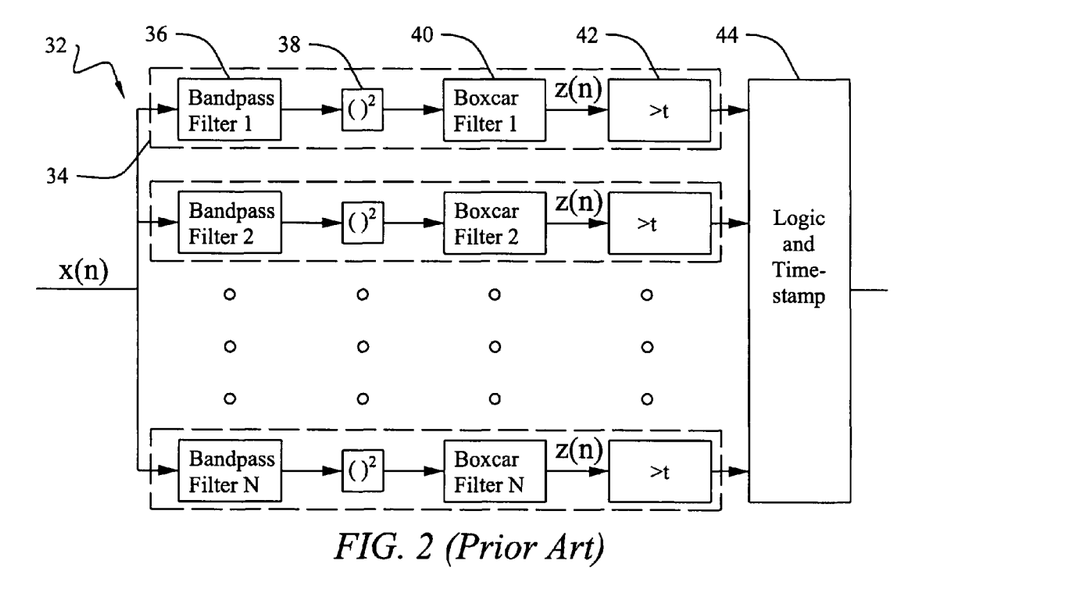
FIG. 2 is a block diagram of a prior art detection system.

FIG. 2 shows a block diagram of a previous embodiment of a multi-band detector. The multi-band detector 32 is realized as software on DSP 20. Multi-band detector 32 includes a plurality of single band detectors 34. The single band detector 34 essentially measures the energy in the band of frequencies delivered within a specified time window. Each single-band detector 34 is a one-channel non-coherent bandpass detector, comprising a bandpass filter 36, a software squaring routine 38, a boxcar filter 40, a thresholding module 42 and a detection analyzer 44. Each input signal $x(n)$ is passed through a bandpass filter 36, which allows a specific band of frequencies to pass and eliminates or attenuates other frequencies. The band of frequencies to be examined is determined by the bandpass filter center frequency $\omega_o$ and bandwidth B. The frequencies are then squared $(\ )^2$ by a software squaring routine 38 and then transferred to a boxcar filter 40 for further signal processing.

The boxcar filter 40 (or sliding average filter) is a lowpass filter with a rectangle-shaped impulse response (akin to a box, hence the name) that passes low frequencies, and eliminates or attenuates high frequencies. This can be implemented with a suitable Finite Impulse Response (FIR) filter with unit-valued coefficients. The filter 40 processes each channel separately to detect if an impact occurred. The boxcar lowpass filter 40 has an impulse response $b(n)=1$, for $n=0, 1, \ldots, M_B-1$ and $b(n)=0$ elsewhere. The boxcar filter 40 output, $z(n)$, is the integrated energy over the most recent $M_B$ samples of its input signal.

A thresholding module 42 examines the boxcar filter output and provides an indication whether an impact occurred on the ocean surface 26. When the measured energy of a signal output from a boxcar filter 40 exceeds the detection threshold t, a detection is registered with a logic and time-stamp module 44. The detection threshold t is chosen proportional to a measured noise power level, so that a constant false-alarm rate is achieved. In signal detection theory, a false alarm occurs where a non-target event exceeds the detection criterion and is identified as a target. The threshold is:

$$t = k\overline{N^2}, \quad (1)$$

where the term $\overline{N^2}$ represents the noise power level, which is continuously calculated by a separate system. The separate system squares each incoming value and then averages the sum of the squares (divide by n) to calculate $\overline{N^2}$. The term k is the threshold multiplier and is calculated by obtaining the false alarm rate curves which allow the system operator to select k to provide the desired false alarm rate. Thus, when a signal exceeds the detection threshold $t=k\overline{N^2}$, a detection is registered, and information regarding the shape of the detected pulse is extracted. This information includes the time of arrival (TOA), pulse strength, and pulse duration. The pulse time of arrival (TOA) is estimated by finding the time corresponding to the peak change in the boxcar output over the detection period. That is, if $z(n)$ denotes the boxcar filter output, the change in the filter output is given by:

$$\Delta z(n) = z(n) - z(n - M_B).$$

The value of $\Delta z(n)$ is monitored over the detection period, and the time index at which $\Delta z(n)$ achieves its peak is reported at the pulse TOA. The pulse strength for the detection is the peak value of the signal $z(n)$ over the detection period. The end of the detection is declared when the boxcar filter output $z(n)$ drops below a second user specified threshold $k_2\overline{N^2}$, where $k_2$ is chosen to be less than k.

Logic and time-stamp module 44 combines the detection and TOA results from the single-band detectors 34 to identify a broad-band event. Once a detector 34 produces a detection, other single-band detectors 34 are examined to see if additional detections exist. For a broad-band detection to be reported, several individual detection bands must report detections within a user-specified maximum inter-band timing skew (MITS) time window. Otherwise, the detection information is discarded as a narrow-band false alarm. Also, for each broad-band detection report, the reported TOA is the average of TOA values from the individual bands. The reported pulse width is the longest pulse width over all detection bands.

To detect gunfire impacts, which are typically broad-band events, previous impact systems incorporating DSP algorithms implemented multiple narrow-band detectors, each examining a separate frequency band. This prior art approach suffers from a number of drawbacks including the large computational requirements for real-time operation. Additionally, many channels are required to monitor a wide range of frequencies, making it impractical for use in tracking soft impacts from a wide range of munitions types.

Thus it would be greatly advantageous to provide a soft impact location system which: (1) incorporates a computationally efficient real-time polyphase digital signal-processing (DSP) algorithm, (2) processes wide-band acoustic munition signatures, (3) monitors the entire Nyquist frequency band for energy, (4) has parameter flexibility (maximum inter-band timing skew or "MITS", number of frequencies required for a detection, etc.), (5) allows users to tailor the DSP algorithm to accommodate many different testing environments and munition types, (6) utilizes software that simulates the DSP algorithm and estimates performance.

SUMMARY OF THE INVENTION

It is therefore the primary object of the present invention to provide a soft impact location system and method that incorporates a computationally efficient real-time polyphase digital signal processing algorithm.

Another object is to provide a soft impact location system that processes wide-band acoustic munition signatures.

Still another object is to provide a soft impact location system which monitors the entire Nyquist frequency band for energy.

It is still another object to provide a soft impact location system that has parameter flexibility (MITS, number of frequencies required for detection, etc.).

Yet another object is to provide a soft impact location system that accommodates many different testing environments and munition types.

Still another object is to provide a soft impact location system that utilizes software that simulates the incorporated digital signal-processing algorithm and estimates performance.

In accordance with the foregoing objects, the preferred embodiment of the present invention comprises a soft impact location system and method which detects and processes wide-band acoustic signatures for testing long-range munitions. The system incorporates a real-time digital signal-processing algorithm that detects the impact signature, processes it, and calculates the time-of-arrival (TOA). The system comprises a polyphase filter bank, boxcar filter, a detection analyzer for detecting an impact, and time-tagging software for calculating the time of impact. The system splits the received hydrophone signal into evenly spaced energy bands, processes each band individually, and then recombines the data to provide a precise time of detection.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE INVENTION

Figure 3:
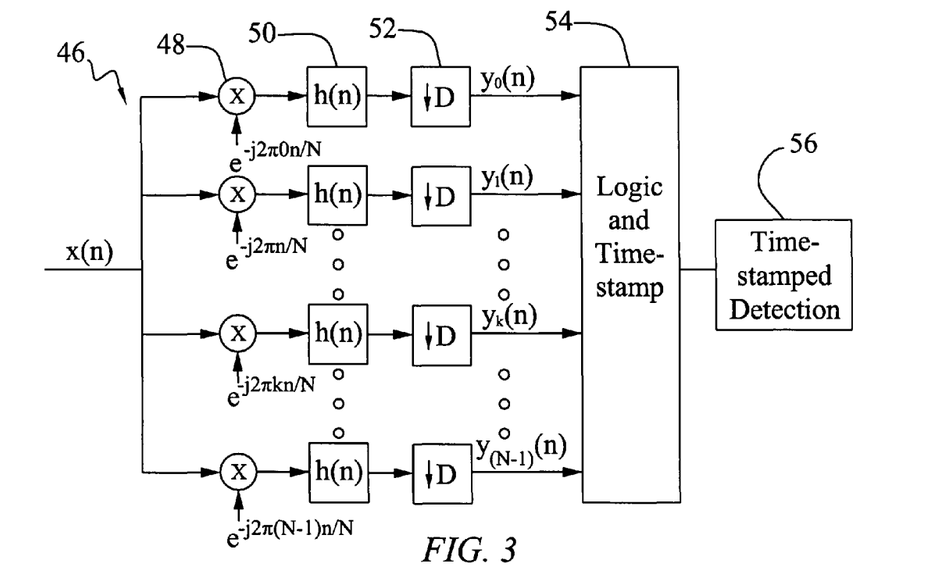
FIG. 3 is a block diagram of a first embodiment of the current invention.

FIG. 3 shows a block diagram of a first embodiment of a polyphase detection system 46 according to the current invention. The polyphase detector 46 registers several of the detection bands and thereby eliminates many false alarms. A polyphase detector 46 can be designed by selecting a collection of N center frequencies distributed across the Nyquist band (0-$F_s$) Hz where $F_s$ is the sampling frequency for a signal for the input sample sequence. The collection of N center frequencies, $\omega_0, \omega_1, \ldots, \omega_k, \ldots, \omega_{N-1}$, is given by the available number of channels and the sampling frequency of the system. Each single-band detector frequency is given by:

$$\omega_k = 2\pi k/N \quad k=0,1,\ldots,N-1. \tag{2}$$

The single band detector is processed by multiplying the input signal, x(n), by:

$$e^{-j\omega_k n}. \tag{3}$$

This gives a signal that translates the spectrum of interest to the origin. This also provides the power about that center frequency by squaring the signal. This reduced bandwidth signal can be provided to a lowpass filter h(n). The lowpass filter bandwidth is selected as B≤1/(2N). The lowpass filtered signal is then decimated at a decimation rate of D=N. This gives N band detectors, each with an output sample rate of 1/D times the original input sample rate. $y_k(n)$ is the output signal for the $k_{th}$ band detector. The output from the N band detectors 46 is used to provide N separate complex detector inputs to a logic and time stamping module. The logic module receives the signals and determines whether an event has occurred. The logic module also calculates the timestamp based on the received signals. The event and timestamp are then transmitted to a receiver such as 30.

In operation, the input signal x(n) is a digital signal provided to a multiplier 48 where it is multiplied by a complex exponential signal, $e^{-j\omega_k n}$, thereby translating the spectrum of interest to the origin. The complex exponential multiplied signal is transferred to a lowpass filter 50 labeled h(n). The low pass filter is the same for each center frequency. The filtered signal is then decimated in the decimation module 52. The decimation rate D is D=N, as calculated above. The decimated signal is transferred to the logic and time-stamp module 54. Logic and time-stamp module 54 determines whether an impact has occurred and when the impact occurred in order. Logic and time-stamp module 54 output provides an indication that a detection has occurred and a signal indicating the time of detection 56. This can be transmitted to a centralized receiver. All of the operations of detector 46 are preferably embodied as software on a digital signal processor such as 20 of FIG. 1.

Figure 4:
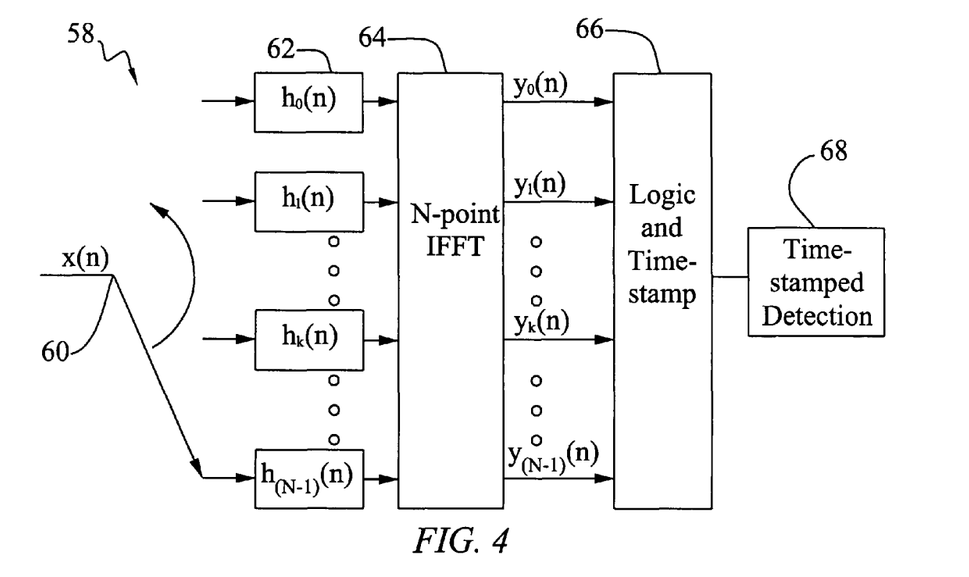
FIG. 4 is a block diagram of an improved embodiment of the current invention.

FIG. 4 is a block diagram of the preferred embodiment of the polyphase detection system 58. This polyphase implementation is numerically equivalent to the polyphase detector 46 shown in FIG. 3, and is significantly more efficient. Here, the original sample sequence x(n) is rotated among outputs by a data parser 60 to a plurality of different lowpass filters 62. Rotating the sample sequence among outputs sequentially provides one sample at each output of parser 60. This operation decimates the sequence before the filter input, giving N separate sample sequences at the reduced sample rate. The separate sequences are then filtered using a set of N separate finite impulse response filters 62. The impulse response of the filter 82 used in the $k^{th}$ branch is given by:

$$h_k(n) = h(k+nN) \; n = 0, 1, \ldots, M/N-1 \quad (4)$$

where h(n) is the impulse response of the original M-coefficient lowpass filters used in 50. The output samples from the N filter serve as the inputs to an N-sample inverse fast Fourier transform (IFFT) processor 64. The processor 64 carries out the following N sample IFFT:

$$y_n = \frac{1}{N}\sum_{k=0}^{N-1} X_k e^{\frac{2\pi j}{N}kn} \; n = 0, \ldots, N-1. \quad (5)$$

IFFT is an efficient algorithm for analyzing frequencies contained in a sampled signal (for digital signal processing). The output samples from the N-sample inverse fast Fourier transform'processor 64 are the complex signals $y_k(n)$ which are input to the logic and time-stamping module 66. Logic and time-stamping module 66 operates the same as 54 discussed with reference to FIG. 3. This provides an output 68, as above.

Figure 5:
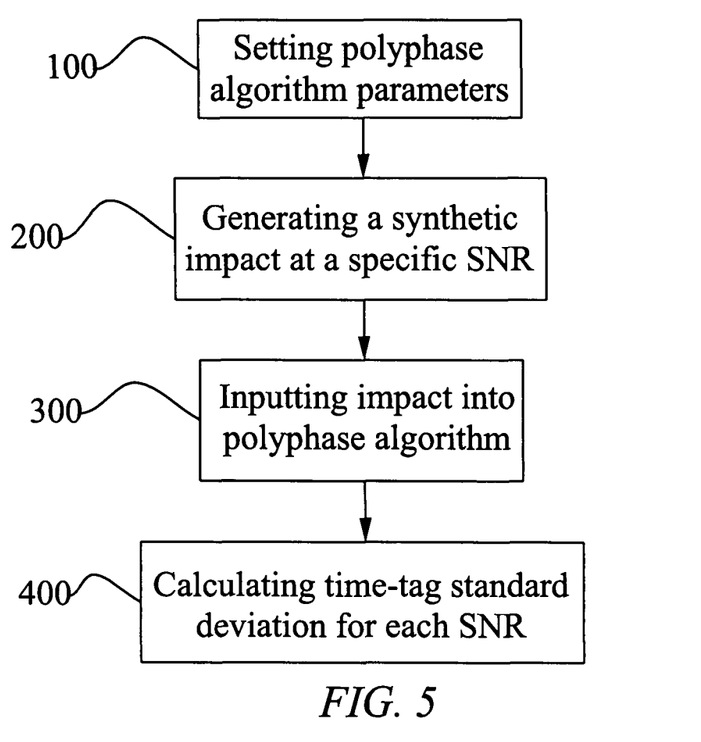
FIG. 5 is a flowchart of the steps for determining the accuracy of time statistics according to a simulation.

FIG. 5 is a flowchart of the steps for determining the accuracy of time statistics for providing parameters to the logic and time-stamping modules 54 and 66. This is performed in order to develop the parameters for actual use. The time that an impact is detected at a hydrophone is not the actual time of impact, as there is a time delay in the hydrophone picking up the acoustic signature. MATLAB™ simulation software from The MathWorks company is preferred for programming these steps; however, one skilled in the art will understand that any programming or simulation software can be utilized.

The method of time-tagging the impact generally comprises the following steps: setting polyphase algorithm parameters (step 100); generating a synthetic impact at a specific signal to noise ratio (SNR) (step 200); inputting impact into polyphase algorithm (step 300); and calculating time-tag standard deviation for each SNR (step 400).

Step 100 involves setting polyphase algorithm parameters. Two key polyphase algorithm parameters are the number of frequency channels N and the length B of the boxcar integration filter 50 of FIG. 3. Each parameter affects performance, and thus each is varied to determine its affect on time-tag statistics. The number of frequency channels N and the length B of the boxcar integration filter are varied based on the time duration of the impact signal of interest. The desired effect on time-tag statistics is to determine the set of parameters to maximize the accuracy of the time-tag.

Step 200 follows in which a realistic controllable surface impact is generated for testing. For present purposes, synthetic Blind Loaded & Plugged impacts are generated for testing. Other impacts could have different characteristics. Blind Loaded & Plugged munitions are nonexplosive rounds that are typically used for naval gunfire testing. These projectiles consist of a forged steel body filled with inert homogenous, dry material (to maximize safety during non-combat operations) and are fitted with a dummy nose plug. The base of a Blind Loaded & Plugged projectile is flat and solid with a ½ caliber boat tail and a single, wide rotating copper band to provide obturation and spin. One of the most common types of rounds that the Navy uses in testing is the 5/54" Caliber Blind Loaded & Plugged MK92-1 Projectile.

Figure 6:
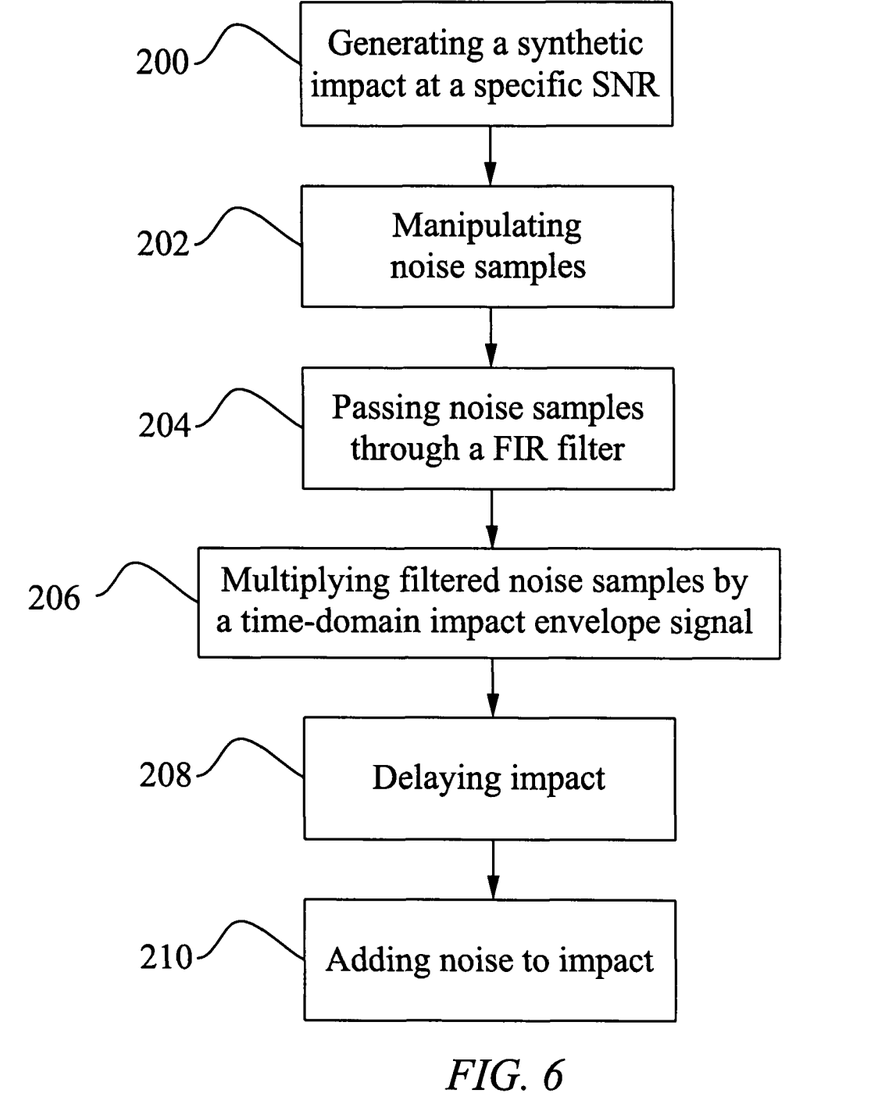
FIG. 6 is a flowchart of the substeps of step 202 carried out by the simulation software.

FIG. 6 shows that step 200, generating a synthetic impact at a specific SNR comprises the following substeps: manipulating noise samples (substep 202); passing noise samples through finite impulse response filter (substep 204); multiplying filtered noise samples by a time-domain impact envelope signal (substep 206); delaying impact (substep 208); and adding noise to the impact ((substep 210).

Step 200 begins with substep 202, manipulating noise samples involves manipulating white and Gaussian noise samples into synthetic impact signals. Manipulating noise samples involves extracting information from both the time and frequency domain from a real Blind Loaded & Plugged impact.

Figure 7:
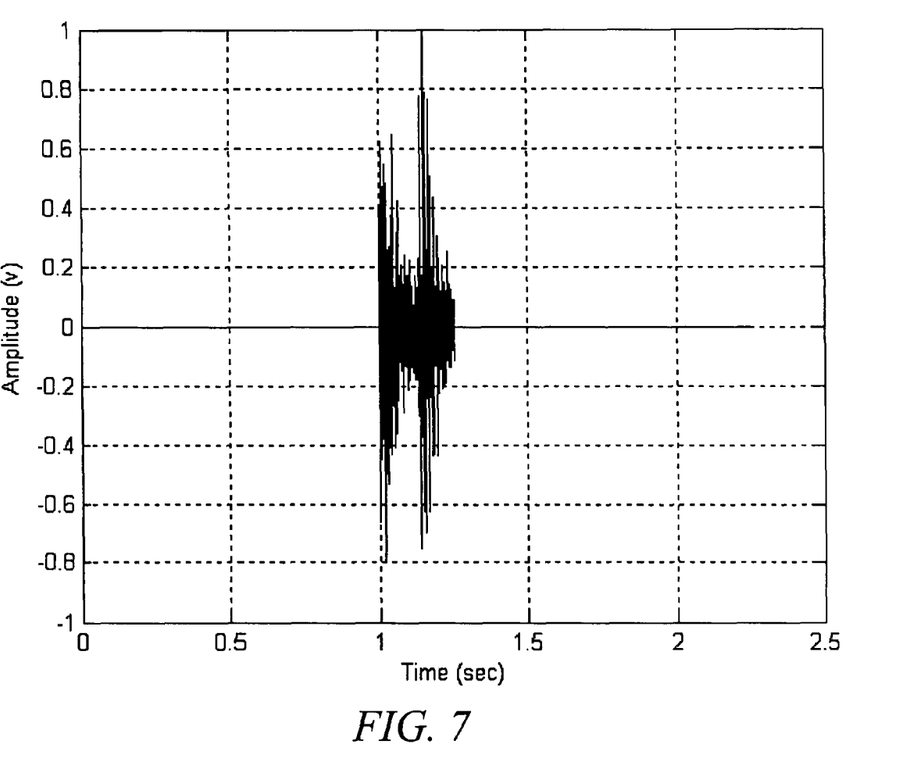
FIG. 7 is a time domain plot of a real Blind Loaded & Plugged impact starting at time equal to one second.

As an example, FIG. 7 illustrates a time domain plot of a real Blind Loaded & Plugged impact starting at 1 second. The signature was received on a bottom-mounted hydrophone in −50 meters of water, 100 meters from the point of impact. The noise before and after the impact was eliminated in the plot. These impact data are sampled at a rate of 48,000 samples per second.

Figure 8:
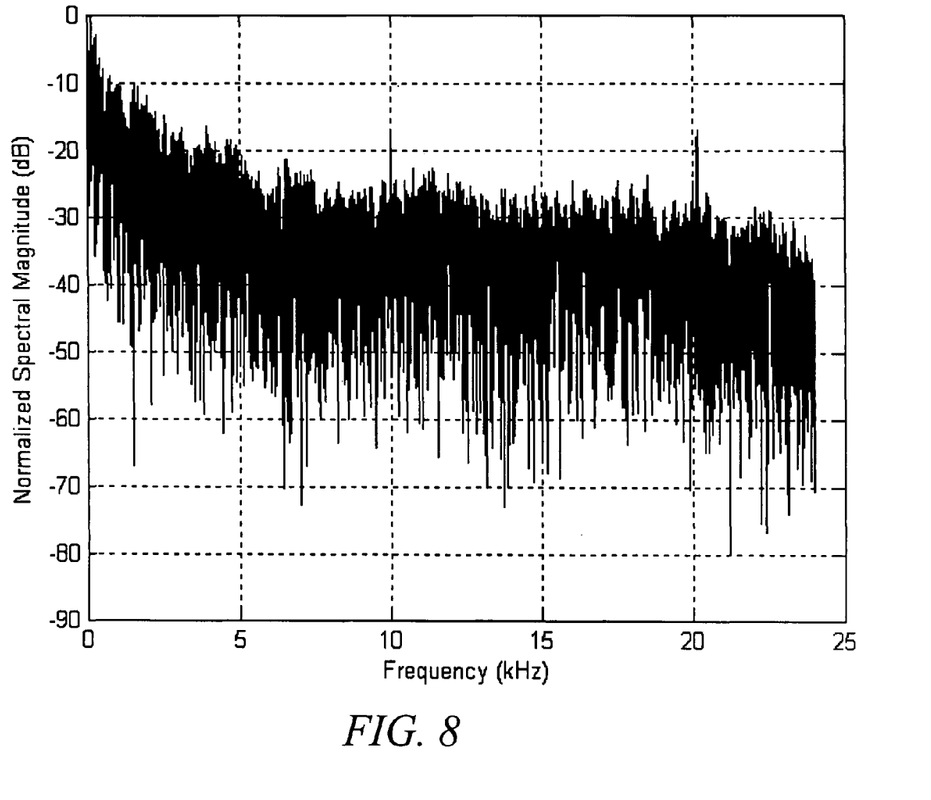
FIG. 8 is a normalized frequency spectrum for the Blind Loaded & Plugged impact shown in FIG. 7.

FIG. 8 shows the frequency spectrum for this Blind Loaded & Plugged impact. The impulsive time-domain nature of the signal creates elevated energy across a wide range of frequencies.

Substep 204 follows in which noise samples are passed through a finite impulse response filter. Following that is substep 206, multiplying filtered noise samples by a time-domain impact envelope signal. At this point, the signal is a synthetic impact starting at time=0 seconds. Substep 208 involves delaying the impact in time to a random, known start time. Because the average power of the synthetic impact is controllable, noise is added to the impact in substep 210, and the result is an impact that starts at a known time at a specified SNR.

Step 300 follows in which the synthetic impact at user-controlled SNR values is to be used as an input signal x(n) to the polyphase algorithm to generate time-tag statistics (i.e. statistical accuracy of time of arrival for assorted combinations of algorithm parameters). Step 400 involves calculating these statistics which include the time-tag standard deviation versus SNR for a given (N, B) polyphase algorithm parameter combination.

Figure 9:
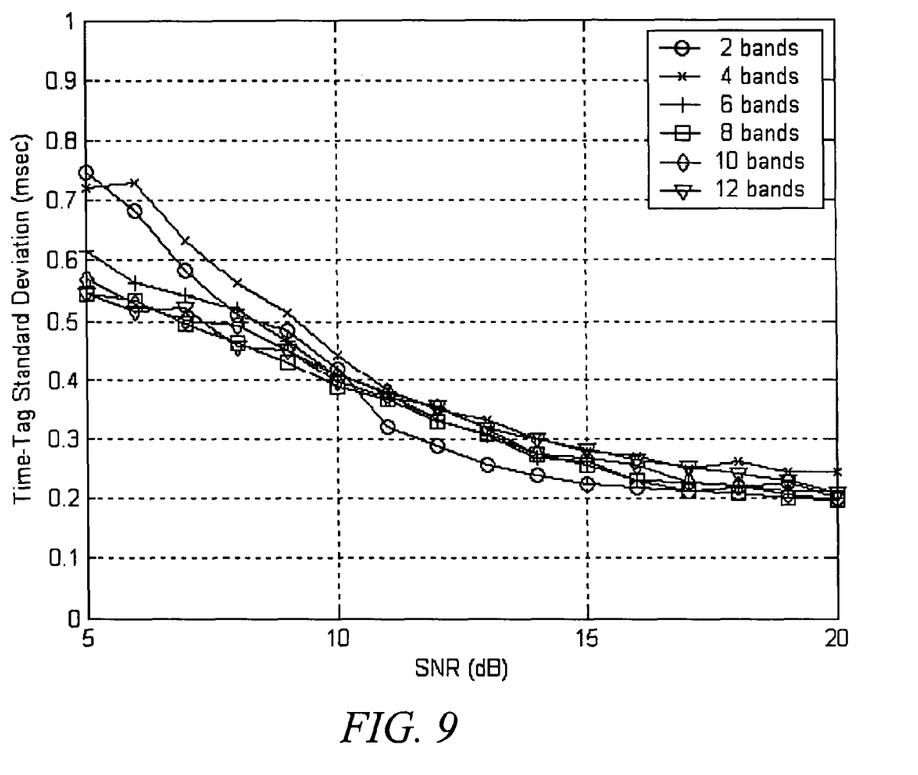
FIG. 9 is a display of timing results for a boxcar filter size B=50 milliseconds at an assorted number of frequency bands N ranging from 2 to 12, for assorted signal-to-noise (SNR) ratios.

FIG. 9 is a display of timing results for a boxcar filter size B=50 milliseconds at an assorted number of frequency bands N ranging from 2 to 12, for assorted signal-to-noise (SNR) ratios. Timing performance is consistent at all frequency band values. Depending on the number of frequency bands, an SNR of at least 7 to 9 dB is required to keep the timing standard deviation below 0.5 msec.

Figure 10:
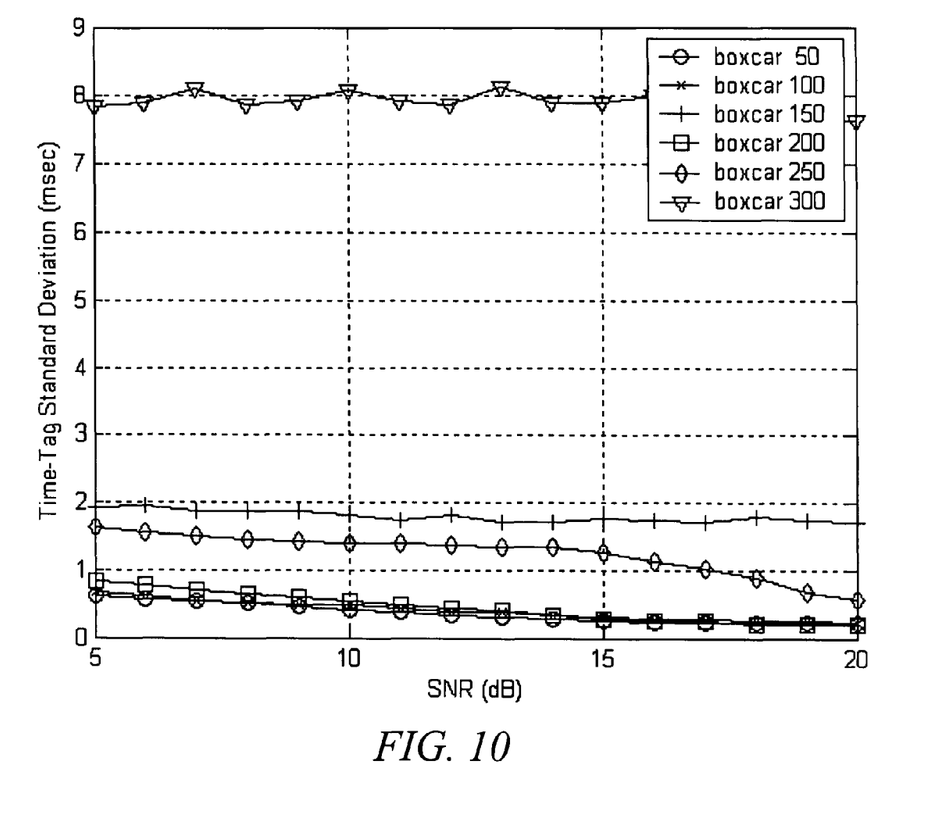
FIG. 10 is a display of timing results produced for six frequency bands N at assorted boxcar B values.

The timing results produced for six frequency bands N at assorted boxcar B values are shown in FIG. 10.

Timing performance was best and quite consistent at boxcar values B=50, 100, and 200 msec. When B was changed to other values (150, 250, and 300 msec), the time-tag standard deviation was above the desired value of 0.5 msec over the entire range of SNRs, and thus the boxcar size parameter has a definite effect on performance. A boxcar value $M_B$ which creates an integration period of ~50 msec yields the best performance. The number of frequency bands N does not have a significant impact on performance.

It should now be apparent that the above-described system provides a computationally efficient real-time polyphase digital signal processing algorithm for monitoring wide-band event signatures over the entire Nyquist frequency band for energy. While this invention was specifically developed for acoustically detecting projectile impacts, it should not be limited to this application.

Additional disclosure concerning this invention is provided by Kennedy, "Soft Impact Location Capability (SILC): Modeling Blind-Loaded and Plugged Impacts and Timing Statistics for the Polyphase Impact Detection Algorithm", NUWC-NPT Technical Memo 05-028, and Kennedy, "A Real-time Polyphase Digital Signal Processing Algorithm for Detecting and Time-tagging Surface Impact Acoustic Signatures," Proceedings of UDT Europe Conference, June 2005, which are incorporated by reference herein.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A detector for detecting a broadband random event from a sampled signal comprising:
    a data parser having an input to receive the sampled signal and a plurality of outputs, and sequentially providing one sample at one of said plurality of outputs;
    a plurality of filters, each filter joined to each data parser output of said plurality of outputs, each filter being designed to remove frequencies above a different predetermined frequency band of interest, and to provide a filtered signal below the frequency band of interest;
    an inverse fast Fourier transformer joined to each filter of said plurality of filters to receive said filtered signal from each filter, said inverse fast Fourier transformer having a plurality of outputs providing a summation of filtered signals with each signal being related to one frequency band of interest; and
    a logic and timestamp module joined to receive the summation of filtered signals related to one frequency of interest from said inverse fast Fourier transformer, said logic and timestamp module to determine the existence of the event from said summations of filtered signals by applying a predetermined event detection criteria, and when a detection occurs providing an event detection signal.

2. The device of claim 1 wherein said event detection signal includes a time-stamp indicating the time of detection.

3. The device of claim 1 wherein said detector is implemented as software on a selected one of a microprocessor or a digital signal processor.

4. The device of claim 1 wherein said predetermined frequency bands of interest are calculated based on the sampling rate of the sampled signal and the available number of frequencies.

5. The device of claim 4 wherein said predetermined event criteria depends on measured characteristics of said event.

6. The device of claim 5 wherein said event is a projectile impact at a surface of a body of water.

\* \* \* \* \*